(12) United States Patent
McLean

(10) Patent No.: US 9,074,756 B2
(45) Date of Patent: Jul. 7, 2015

(54) LIGHT GUIDE AND ILLUMINATION ASSEMBLY INCORPORATING THE SAME

(75) Inventor: Robert James Neil McLean, Essex (GB)

(73) Assignee: Buhler Sortex Ltd, London (GB)

( * ) Notice: Subject to any disclaimer, the term of this patent is extended or adjusted under 35 U.S.C. 154(b) by 1094 days.

(21) Appl. No.: 13/124,754

(22) PCT Filed: Oct. 16, 2009

(86) PCT No.: PCT/GB2009/002478
§ 371 (c)(1),
(2), (4) Date: Jan. 11, 2012

(87) PCT Pub. No.: WO2010/043873
PCT Pub. Date: Apr. 22, 2010

(65) Prior Publication Data
US 2014/0321111 A1    Oct. 30, 2014

(30) Foreign Application Priority Data

Oct. 17, 2008    (GB) .................................... 0819068.8

(51) Int. Cl.
| | |
|---|---|
| *F21S 4/00* | (2006.01) |
| *F21V 13/10* | (2006.01) |
| *F21V 8/00* | (2006.01) |
| *G03B 15/02* | (2006.01) |
| *G03B 15/06* | (2006.01) |

(Continued)

(52) U.S. Cl.
CPC .............. *F21V 13/10* (2013.01); *G02B 6/0096* (2013.01); *G03B 15/02* (2013.01); *G03B 15/06* (2013.01); *G09F 13/14* (2013.01); *G09F 13/18* (2013.01)

(58) Field of Classification Search
CPC ...... F21V 13/10; G02B 6/0096; G03B 15/02; G09F 13/14; G09F 13/18
USPC ........... 362/223, 217.02, 217.05, 217.08, 296
See application file for complete search history.

(56) References Cited

U.S. PATENT DOCUMENTS

| | | |
|---|---|---|
| 3,676,667 A | 7/1972 | Malifaud |
| 4,458,303 A | 7/1984 | Berns |

(Continued)

FOREIGN PATENT DOCUMENTS

| | | |
|---|---|---|
| AU | 533 891 | 12/1983 |
| EP | 1 630 576 | 3/2006 |

(Continued)

OTHER PUBLICATIONS

International Search Report for corresponding application No. PCT/GB2009/002478 dated Mar. 25, 2010.

*Primary Examiner* — Ali Alavi
(74) *Attorney, Agent, or Firm* — Renner, Otto, Boisselle & Sklar, LLP

(57) ABSTRACT

A light guide (15) for delivering an illumination, in particular a reference or background illumination, the light guide comprising: a mirror box (21) which defines a mirror cavity (23), which receives a light source (19) therein, and includes an illumination aperture (25) from which an illumination is delivered; a transmissive diffuser (27) which is located at the illumination aperture to render the illumination diffuse; and a shutter member (41) which is movable into the cavity to obstruct the light source and provide for control of the radiance of the delivered illumination, whereby control of the radiance of the delivered illumination is determined by a position of the shutter member in the cavity.

18 Claims, 4 Drawing Sheets

(51) Int. Cl.
  *G09F 13/14* (2006.01)
  *G09F 13/18* (2006.01)

(56) References Cited

U.S. PATENT DOCUMENTS

| | | | |
|---|---|---|---|
| 4,947,292 A | | 8/1990 | Vlah |
| 5,034,864 A | * | 7/1991 | Oe ................................ 362/224 |
| 5,509,223 A | * | 4/1996 | Jung ............................... 40/564 |
| 2002/0006039 A1 | | 1/2002 | Ueda et al. |
| 2004/0160757 A1 | * | 8/2004 | Kuo ................................ 362/31 |
| 2005/0018147 A1 | | 1/2005 | Lee et al. |

FOREIGN PATENT DOCUMENTS

| | | |
|---|---|---|
| WO | 99/13266 | 3/1999 |
| WO | 2005/088366 | 9/2005 |
| WO | 2009/064607 | 5/2009 |

\* cited by examiner

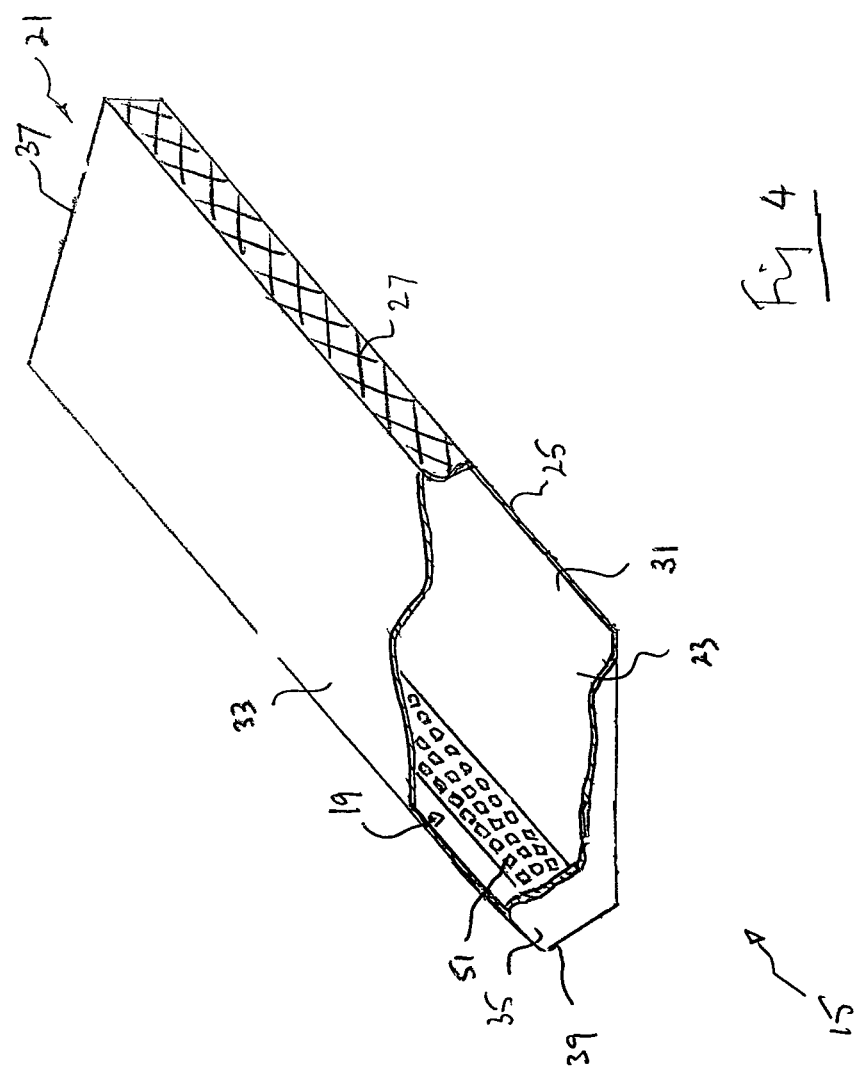

LIGHT GUIDE AND ILLUMINATION ASSEMBLY INCORPORATING THE SAME

The present invention relates to a light guide for providing elongate illumination from a light source, in particular reference illumination, often alternatively referred to as background illumination, and an illumination assembly incorporating the same.

The present invention has many applications, including providing reference illumination in sorting machines, where product, such as foodstuffs, is imaged against a reference or background. In such sorting machines, the reference has to have a physical extent which is large enough to fill the field of view of the imaging camera or cameras, and also cater for positional errors owing to manufacturing tolerances. The reference also has to have a radiance greater than that observed from the most reflective commodity to be sorted so as to allow the signals from the reference and the commodity to be distinguished, and further be adjustable to allow for sorting of commodities of different reflectance.

One current light guide comprises an elongate box, which encloses a fluorescent tube on five sides and includes an illumination aperture from which illumination is delivered to an angled white reflector plate. The internal surfaces of the box are coated with a diffusing white coating, which diffusely reflects the light from the fluorescent tube from the illumination aperture. In this illumination assembly, the radiance is adjusted by controlling the angle of inclination of the reflector plate.

Another light guide is disclosed in WO-A-2005/088366, which comprises a pair of spaced elongate plates and an arrangement of mirrors.

These light guides suffer, however, from two particular drawbacks, in that the radiance is not uniform across the viewable area and the maximum radiance is not large enough to accommodate all commodities to be sorted.

It is thus an aim of the present invention to provide an improved light guide and illumination assembly.

It is one particular aim of the present invention to provide a light guide and illumination assembly which provides for a more uniform radiance as compared to current light guides and illumination assemblies.

It is another particular aim of the present invention to provide a light guide and illumination assembly which provides a greater maximum radiance as compared to current light guides and illumination assemblies.

In one aspect the present invention provides a light guide for delivering an illumination, in particular a reference or background illumination, the light guide comprising: a mirror box which defines a mirror cavity, which receives a light source therein, and includes an illumination aperture from which an illumination is delivered; a transmissive diffuser which is located at the illumination aperture to render the illumination diffuse; and a shutter member which is movable into the cavity to obstruct the light source and provide for control of the radiance of the delivered illumination, whereby control of the radiance of the delivered illumination is determined by a position of the shutter member in the cavity.

In one embodiment the mirror box provides for multiple reflections of light radiated from the light source upstream of the diffuser, thereby providing for homogenisation of the delivered illumination.

In one embodiment the dimension of the cavity decreases in a direction towards the illumination aperture.

In one embodiment the cavity tapers inwardly in the direction towards the illumination aperture.

In one embodiment the mirror box comprises first and second main mirror sections, forward edges of which define the illumination aperture, first and second end sections, which are located to the respective ends of the main mirror sections, and a rear mirror section which is operative to reflect light forwardly through the illumination aperture and the diffuser.

In one embodiment the main mirror sections have a length in a direction front to rear which provides for multiple reflections of light radiated from the light source upstream of the diffuser.

In one embodiment the mirror sections are formed of enhanced-reflectivity aluminium.

In one embodiment the illumination aperture is an elongate aperture and the illumination is an elongate illumination.

In one embodiment the diffuser provides for Lambertian-type diffusion.

In one embodiment the diffuser is formed of a translucent material.

In one embodiment the shutter member is insertable into the cavity, whereby control of the radiance of the light source is determined by setting an insertion depth of the shutter member.

In one embodiment the shutter member comprises a plate.

In one embodiment the shutter member is inserted into the cavity from only one side thereof, thereby asymmetrically shuttering the light source.

In another aspect the present invention provides an illumination assembly comprising the above-described light guide and a light source located within the mirror box.

In one embodiment the light source comprises a single, elongate element.

In one embodiment the light source has a greater length than the mirror box, whereby regions at the ends of the light source are located outside of the mirror box and not utilized in providing the illumination.

In one embodiment the light source comprises a fluorescent tube.

In another embodiment the light source comprises a plurality of light elements.

In one embodiment the light elements comprise point elements, such as LEDs.

In a further aspect the present invention provides an illumination assembly for delivering an elongate illumination, in particular a reference or background illumination, the illumination assembly comprising: a light guide comprising a mirror box which defines an elongate mirror cavity, which receives an elongate light source therein, and includes an elongate illumination aperture from which an elongate illumination is delivered, and a transmissive diffuser which is located at the illumination aperture to render the illumination diffuse; and an elongate light source located within the cavity, wherein the light source has a greater length than the mirror box, whereby regions at the ends of the light source are located outside of the mirror box and not utilized in providing the illumination.

In one embodiment the mirror box provides for multiple reflections of light radiated from the light source upstream of the diffuser, thereby providing for homogenisation of the delivered illumination.

In one embodiment the dimension of the cavity decreases in a direction towards the illumination aperture.

In one embodiment the cavity tapers inwardly in the direction towards the illumination aperture.

In one embodiment the mirror box comprises first and second main mirror sections, forward edges of which define the illumination aperture, first and second end sections, which are located to the respective ends of the main mirror sections, and a rear mirror section which is operative to reflect light forwardly through the illumination aperture and the diffuser.

In one embodiment the main mirror sections have a length in a direction front to rear which provides for multiple reflections of light radiated from the light source upstream of the diffuser.

In one embodiment the mirror sections are formed of enhanced-reflectivity aluminium.

In one embodiment the diffuser provides for Lambertian-type diffusion.

In one embodiment the diffuser is formed of a translucent material.

In one embodiment the light guide further comprises a shutter member which is movable into the cavity to obstruct the light source and provide for control of the radiance of the delivered illumination.

In one embodiment the shutter member is insertable into the cavity, whereby control of the radiance of the light source is determined by setting an insertion depth of the shutter member.

In one embodiment the shutter member comprises a plate.

In one embodiment the shutter member is inserted into the cavity from only one side thereof, thereby asymmetrically shuttering the light source.

In one embodiment the light source comprises a single, elongate element.

In one embodiment the light source comprises a fluorescent tube.

In a still further aspect the present invention provides an illumination assembly for delivering an elongate illumination, in particular a reference or background illumination, the illumination assembly comprising: a light guide comprising a mirror box which defines an elongate mirror cavity, which receives a light source therein, and includes an elongate illumination aperture from which an elongate illumination is delivered, and a transmissive diffuser which is located at the illumination aperture to render the illumination diffuse; and a light source located within the cavity, wherein the light source comprises a plurality of light elements arranged along a length of the cavity, at least ones of which are selectively illuminatable to control the radiance of the delivered illumination.

In one embodiment the dimension of the cavity decreases in a direction towards the illumination aperture.

In one embodiment the cavity tapers inwardly in the direction towards the illumination aperture.

In one embodiment the mirror box comprises first and second main mirror sections, forward edges of which define the illumination aperture, first and second end sections, which are located to the respective ends of the main mirror sections, and a rear mirror section which is operative to reflect light forwardly through the illumination aperture and the diffuser.

In one embodiment the main mirror sections have a length in a direction front to rear which provides for multiple reflections of light radiated from the light source upstream of the diffuser.

In one embodiment the mirror sections are formed of enhanced-reflectivity aluminium.

In one embodiment the diffuser provides for Lambertian-type diffusion.

In one embodiment the diffuser is formed of a translucent material.

In still yet another aspect the present invention provides a light guide for delivering an illumination, in particular a reference or background illumination, the light guide comprising: a mirror box which defines a mirror cavity, which receives a light source therein, and includes an illumination aperture from which illumination is delivered; and a transmissive diffuser which is located at the illumination aperture to render the illumination diffuse.

A preferred embodiment of the present invention will now be described hereinbelow by way of example only with reference to the accompanying drawings, in which:

FIG. 4 illustrates a fragmentary perspective view of an illumination assembly as one modification of the illumination assembly of FIG. 1.

Figure 1:
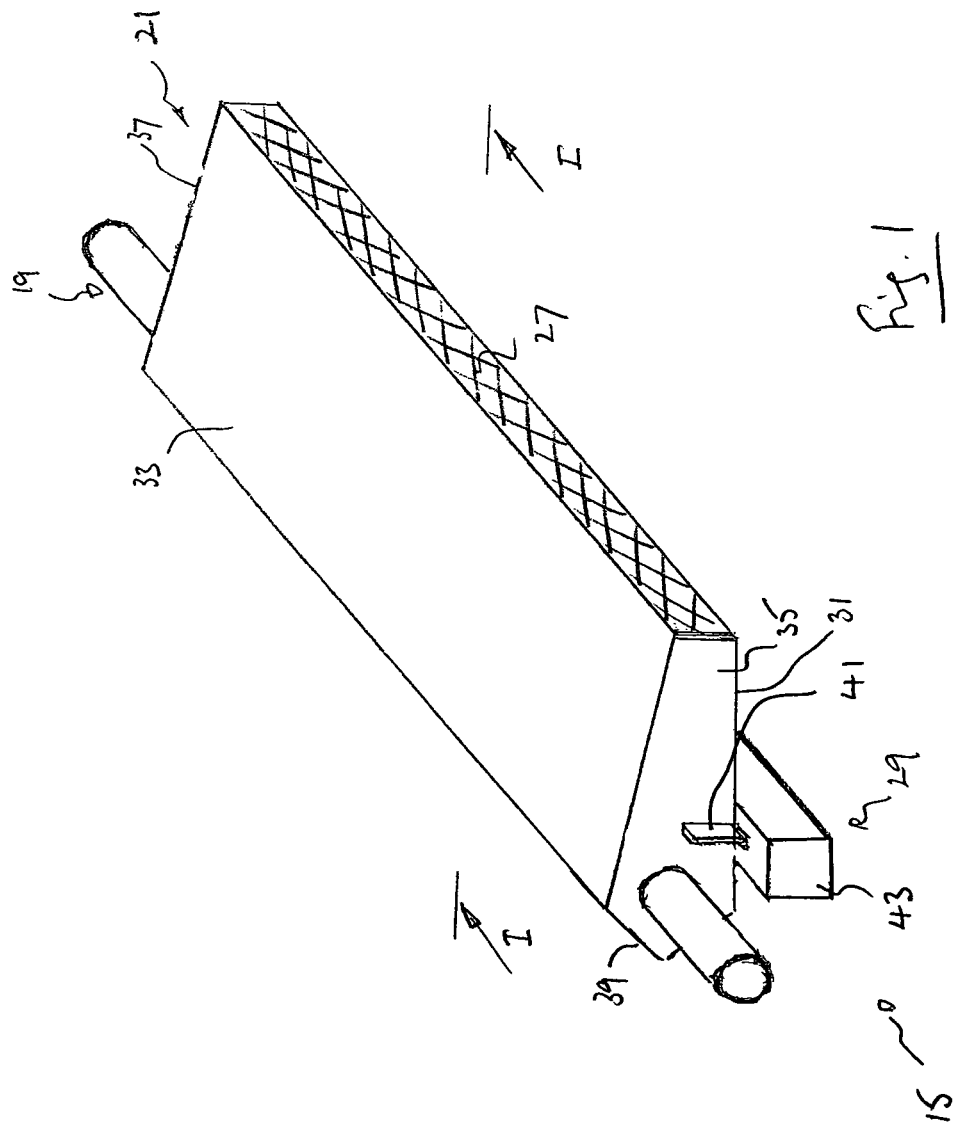
FIG. 1 illustrates a perspective view of an illumination assembly in accordance with a preferred embodiment of the present invention.
Figure 2:
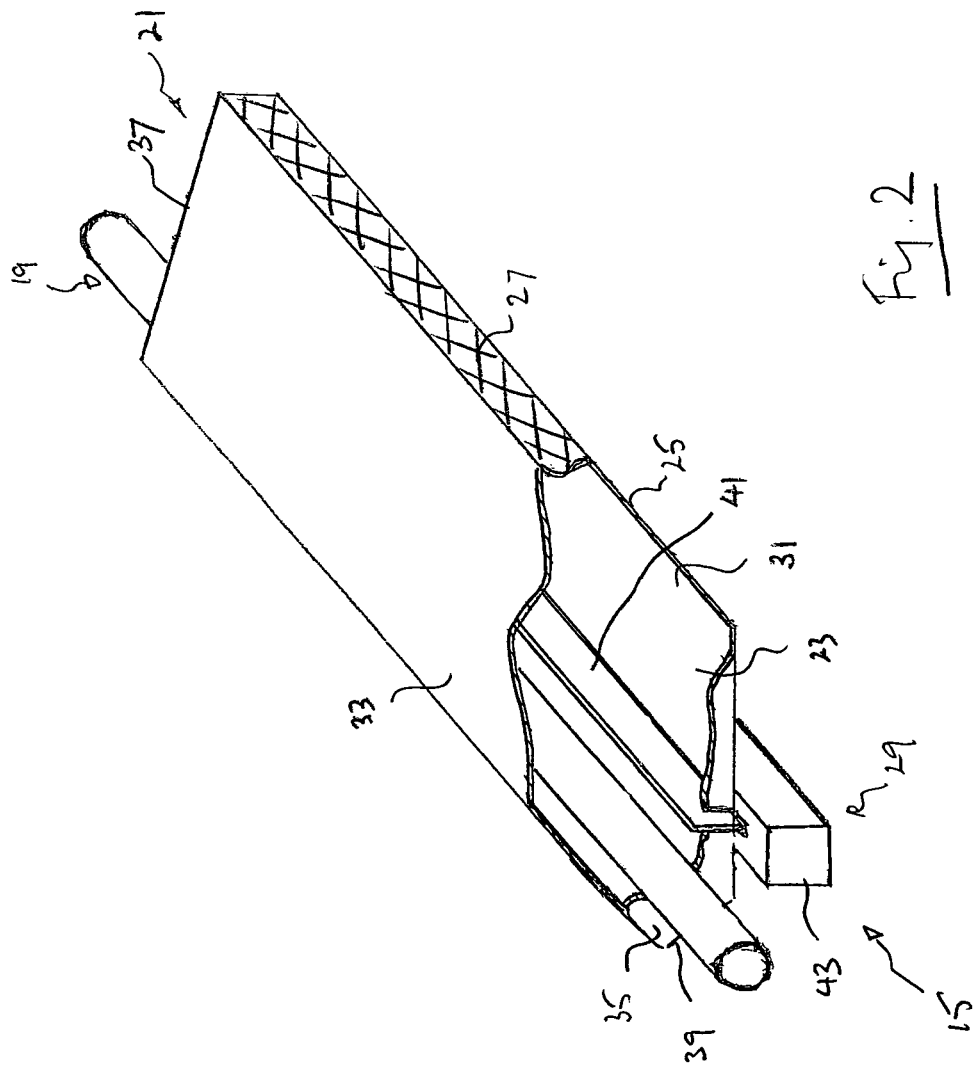
FIG. 2 illustrates a fragmentary perspective view of the illumination assembly of FIG. 1.
Figure 3:
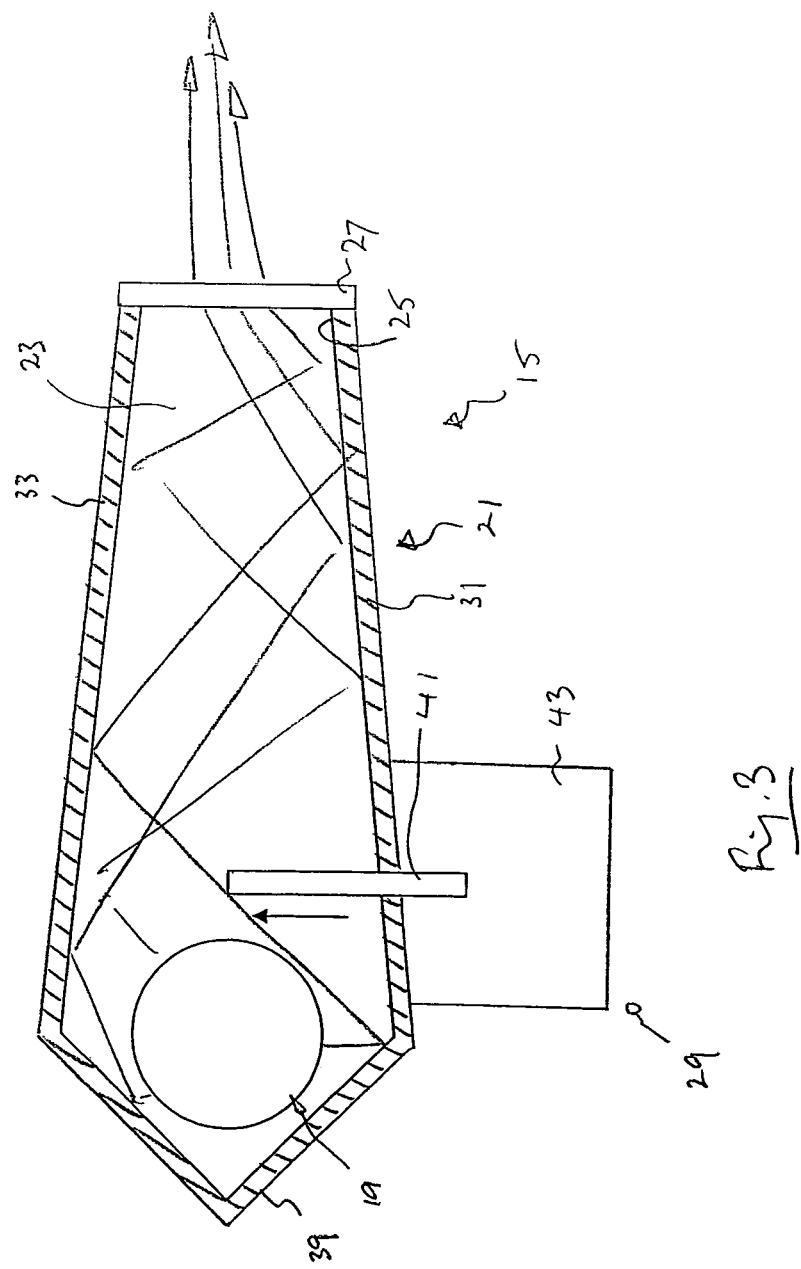
FIG. 3 illustrates a vertical sectional view (along section I-I) of the illumination assembly of FIG. 1.

The illumination assembly comprises a light guide 15 and a light source 19 which is located within the light guide 15, in this embodiment in a rear part thereof.

The light guide 15 comprises a mirror box 21 which defines a mirror cavity 23, which receives the light source 19 therein, and includes an illumination aperture 25, in this embodiment an elongate aperture, from which illumination is delivered, a transmissive diffuser 27 which is located in the illumination aperture 25 to render the illumination diffuse, and a shutter mechanism 29 which is operative to obstruct the light source 19 and provide for control of the intensity of the radiance of the delivered illumination.

The mirror box 21 comprises first and second main mirror sections 31, 33, in this embodiment elongate sections, the forward edges of which define the illumination aperture 25, first and second end sections 35, 37, which are located to the respective ends of the main mirror sections 31, 33, and a rear mirror section 39 which is located rearwardly of the light source 19 to reflect light forwardly through the illumination aperture 25 and the diffuser 27.

With this configuration, all of the light from the light source 19 is constrained within the mirror box 21 and delivered through the diffuser 27, thereby providing for greater radiance than could be achieved from the light source 19 only, when located at the same relative position.

In this embodiment the mirror box 21 is configured to provide for multiple reflections of light radiated from the light source 19 upstream of the diffuser 27, thereby providing for greater homogenisation of the delivered illumination.

In this embodiment the main mirror sections 31, 33 have a length in a direction front to rear which provides for multiple reflections of light radiated from the light source 19 upstream of the diffuser 27.

In this embodiment the vertical dimension of the illumination aperture 25, as defined between the forward edges of the main mirror sections 31, 33, is smaller than the vertical dimension at a rear edge thereof, which provides for multiple reflections and increased radiance. The vertical dimension of the illumination aperture 25 is determined by the maximum radiance requirement of the delivered illumination.

In this embodiment the main mirror sections 31, 33 taper inwardly in the forward direction, such that the mirror cavity 23 tapers inwardly in the forward direction.

In this embodiment the mirror sections 31, 33, 35, 37, 39 are formed of enhanced-reflectivity aluminium.

In this embodiment the diffuser 27 provides for Lambertian-type diffusion, and is typically formed of a translucent material, such as opal Perspex (RTM).

In this embodiment the shutter mechanism 29 comprises a shutter member 41, here a plate, such as a painted mild steel plate, which is movable into the mirror cavity 23, and an actuator 43 for moving the shutter member 41. The shutter mechanism 29 allows control of the effective vertical dimension of the light source 19, thereby providing for control of the radiance by setting the insertion depth of the shutter member 41.

In this embodiment the shutter member 41 is inserted into the mirror cavity 23 from only one side relative to the light source 19. This one-sided insertion of the shutter member 41 is possible by the homogenizing effect achieved by the configuration of the mirror box 21.

In this embodiment the light source 19 comprises a single, elongate element, here a fluorescent tube, and the light source 19 has a greater length than the mirror box 21, whereby the dead areas at the ends of the fluorescent tube are located outside of the mirror box 21 and not utilized in providing illumination.

In another embodiment the light source 19 could comprise a plurality of light elements, typically point elements, such as LEDs.

Finally, it will be understood that the present invention has been described in its preferred embodiment and can be modified in many different ways without departing from the scope of the invention as defined by the appended claims.

In one modification, as illustrated in FIG. 4, the shutter mechanism 29 could be omitted and the light source 19 could comprise a plurality of light elements 51, such as LEDs, ones of which can be selectively illuminated to control the intensity of the radiance of the delivered illumination. In one embodiment a two-point (max and min) calibration algorithm can be employed for each of the light elements 51, in order to maintain uniformity across the background. In an alternative embodiment a dynamic setting routine could be employed which utilizes feedback from the one or more cameras.

The invention claimed is:

1. A sorting machine illumination assembly for delivering an elongate illumination as a reference or background illumination for a field of view of an imaging camera or cameras, the illumination assembly comprising:
   a light guide comprising a mirror box which defines an elongate mirror cavity, which receives an elongate light source therein, and includes an elongate illumination aperture from which an elongate illumination is delivered, the mirror box comprising first and second main mirror sections, forward edges of which define the illumination aperture, and a transmissive diffuser which is located at the illumination aperture to render the illumination diffuse; and
   an elongate light source located within the cavity along a length of the cavity, wherein the light source has a greater length than the mirror box, whereby regions at the ends of the light source are located outside of the mirror box and not utilized in providing the illumination;
   wherein the mirror box provides for multiple reflections of light radiated from the light source upstream of the diffuser, thereby providing for homogenisation of the delivered illumination.

2. The illumination assembly of claim 1, wherein the dimension of the cavity decreases in a direction towards the illumination aperture.

3. The illumination assembly of claim 2, wherein the cavity tapers inwardly in the direction towards the illumination aperture.

4. The illumination assembly of claim 1, wherein the mirror box further comprises first and second end sections, which are located to the respective ends of the main mirror sections, and a rear mirror section which is operative to reflect light forwardly through the illumination aperture and the diffuser.

5. The illumination assembly of claim 1, wherein the light source comprises a single, elongate element.

6. The illumination assembly of claim 5, wherein the light source comprises a fluorescent tube.

7. The illumination assembly of claim 1, wherein the light source comprises a plurality of light elements.

8. The illumination assembly of claim 1, wherein the light source comprises a plurality of light elements arranged along the length of the cavity, at least ones of which are selectively illuminatable to control the radiance of the delivered illumination.

9. The illumination assembly of claim 1, wherein the light guide further comprises a shutter member which is movable into the cavity to obstruct the light source and provide for control of the radiance of the delivered illumination, whereby control of the radiance of the delivered illumination is determined by a position of the shutter member in the cavity.

10. The illumination assembly of claim 9, wherein the shutter member is insertable into the cavity, whereby control of the radiance of the light source is determined by setting an insertion depth of the shutter member.

11. The illumination assembly of claim 10, the shutter member comprises a plate.

12. The illumination assembly of claim 10, wherein the shutter member is inserted into the cavity from only one side thereof, thereby asymmetrically shuttering the light source.

13. The illumination assembly of claim 1, wherein the mirror sections are formed of enhanced-reflectivity aluminium.

14. A sorting machine incorporating the illumination assembly of claim 1 and one or more imaging cameras, wherein the elongate illumination provides a reference or background illumination for a field of view of the imaging camera or cameras.

15. A sorting machine illumination assembly for delivering an elongate illumination as a reference or background illumination for a field of view of an imaging camera or cameras, the illumination assembly comprising:
   a light guide comprising a mirror box which defines an elongate mirror cavity, which receives a light source therein, and includes an elongate illumination aperture from which an elongate illumination is delivered, the mirror box comprising first and second main mirror sections, forward edges of which define the illumination aperture, and a transmissive diffuser which is located at the illumination aperture to render the illumination diffuse; and
   a light source located within the cavity along a length of the cavity, wherein the light source comprises a plurality of light elements arranged along the length of the cavity, at least ones of which are selectively illuminatable to control the radiance of the delivered illumination.

16. The illumination assembly of claim 15, wherein a two-point (maximum and minimum) calibration algorithm is employed for each of the light elements to maintain uniformity across the delivered illumination.

17. The illumination assembly of claim 15, wherein a dynamic setting routine is employed which utilizes feedback from one or more cameras to maintain uniformity across the delivered illumination.

18. A method of using an illumination assembly in a sorting machine to deliver an elongate illumination as a reference or background illumination for a field of view of an imaging camera or cameras of the sorting machine, the method comprising:

providing a light guide comprising a mirror box which defines an elongate mirror cavity and includes an elongate illumination aperture from which an elongate illumination is delivered, the mirror box comprising first and second main mirror sections, forward edges of which define the illumination aperture, and a transmissive diffuser which is located at the illumination aperture to render the illumination diffuse; and providing an elongate light source within the cavity along a length of the cavity, wherein the light source has a greater length than the mirror box, whereby regions at the ends of the light source are located outside of the mirror box, and not utilized in providing the illumination;

whereby the mirror box provides for multiple reflections of light radiated from the light source upstream of the diffuser, thereby providing for homogenisation of the delivered illumination.

* * * * *